United States Patent
Glessner et al.

(10) Patent No.: US 9,878,947 B1
(45) Date of Patent: Jan. 30, 2018

(54) POLYVINYL ALCOHOL ENGINEERED DUCTILE MORTAR AND METHOD OF MAKING THE SAME

(71) Applicant: GST INTERNATIONAL, INC., Sparks, NV (US)

(72) Inventors: James W. Glessner, Sebastopol, CA (US); Thomas Martin, Santa Rosa, CA (US); Richard McCabe, Santa Rosa, CA (US)

(73) Assignee: GST International, Inc., Sparks, NV (US)

( * ) Notice: Subject to any disclaimer, the term of this patent is extended or adjusted under 35 U.S.C. 154(b) by 0 days.

(21) Appl. No.: 14/179,439

(22) Filed: Feb. 12, 2014

Related U.S. Application Data

(60) Provisional application No. 61/763,865, filed on Feb. 12, 2013.

(51) Int. Cl.
| | | |
|---|---|---|
| *C04B 24/00* | (2006.01) | |
| *C04B 28/02* | (2006.01) | |
| *C04B 16/06* | (2006.01) | |
| *C04B 24/02* | (2006.01) | |
| C04B 111/10 | (2006.01) | |
| C04B 111/50 | (2006.01) | |
| C04B 111/00 | (2006.01) | |

(52) U.S. Cl.
CPC ........... *C04B 24/00* (2013.01); *C04B 16/0641* (2013.01); *C04B 24/02* (2013.01); *C04B 28/02* (2013.01); *C04B 2111/00155* (2013.01); *C04B 2111/1006* (2013.01); *C04B 2111/506* (2013.01)

(58) Field of Classification Search
CPC . C04B 24/24; C04B 16/0616; C04B 16/0641; C04B 26/02
See application file for complete search history.

(56) References Cited

U.S. PATENT DOCUMENTS

| | | | |
|---|---|---|---|
| 6,809,131 B2 | 10/2004 | Li et al. | |
| 7,241,338 B2 | 7/2007 | Li et al. | |
| 7,799,127 B2 | 9/2010 | Li et al. | |
| 2009/0044726 A1* | 2/2009 | Brouillette | ............ B28C 9/0463 106/706 |
| 2009/0306249 A1* | 12/2009 | Lavin | ...................... C04B 28/02 524/4 |

* cited by examiner

*Primary Examiner* — Wenwen Cai
(74) *Attorney, Agent, or Firm* — Craig M. Stainbrook; Stainbrook & Stainbrook, LLP

(57) ABSTRACT

A high performance engineered composite cementitious ductile mortar including a predetermined amount of matrix interactive fibers; a water reducer having a plasticizing effect; and a defoamer/plasticizer having a plasticizing effect. A carboxylic acid polymer or carboxylic acid copolymer based superplasticizer are not included in the defoamer/plasticizer or the water reducer.

16 Claims, No Drawings

POLYVINYL ALCOHOL ENGINEERED DUCTILE MORTAR AND METHOD OF MAKING THE SAME

CROSS REFERENCES TO RELATED APPLICATIONS

The present application claims the benefit of U.S. Provisional Patent Application Ser. No. 61/763,865, filed Feb. 12, 2013.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The present invention relates generally to engineered cementitious composite materials, and more particularly to a highly workable polyvinyl alcohol based engineered ductile mortar.

Background Discussion

Mortar based engineered cementitious composite compositions ("ECCs"), frequently referred to as "bendable concretes," are known. The dramatically increased strain capacity relative to conventional Portland cement has made them highly desirable for use in myriad applications. Unlike conventional cement-based concretes, ECCs do not include aggregate, but substitute for aggregate some kind of fiber material, typically a polymeric fiber of some kind. As an organic material from which reinforcement fibers can be made, polyvinyl alcohol has proven to have superior qualities, principally owing to the enhanced ductility and tensile strength achieved by the composition when set.

The challenge in designing engineered cementitious composites, including PVA-based ECCs, is to provide a composition with rheological properties that make it easy to use—for instance, pumpable and flowable for spray applications, or workable for trowel applications. In consequence, a number of admixtures have been devised to enhance the rheological properties of ECCs. The most creative and prolific intelligence directed to the task has been that of Victor C. Li, Ph.D., a professor in the Department of Civil and Environmental Engineering at the University of Michigan, Ann Arbor, and director of the Advanced Civil Engineering Material Research Laboratories. Dr. Li has devised a number of remarkable ECCs with improved self-compaction, high early strength, and pumpability for spray applications. See, for instance, U.S. Pat. Nos. 6,809,131; 7,241,338; and 7,799,127.

On the other hand, Dr. Li and his colleagues have yet to devise a composition that has properties desirable for commercial use by industry and governments. This is largely because achieving both the desired tensile strength and the ductility necessary to avoid catastrophic failure, the use of some kind of dispersant is needed to ensure that the fiber particles are uniformly (or at least well) dispersed. To create a homogeneous mix, several kinds of "superplasticizers" have been identified and/or devised, nearly all of which comprise carboxylic acid polymers and copolymers. These chemicals act both as dispersants to prevent particle aggregation and bulking, and to improve the rheological properties, principally flow characteristics, of the ECCs. They also reduce the amount of water needed in the composition, and in consequence they are also known as "high range water reducers." The state of the art in "superplasticizers" for ECCs is currently found in the use of polycarboxylate ether-based superplasticizers ("PCEs"). They can be added to cement in small amounts (e.g., 0.15-0.3% by cement weight), while still providing good fiber particle dispersion and dramatic water reduction.

The shortcoming and problem with the use of PCEs in ECCs, a problem that remains to this day, is that the product is effectively unworkable once applied to a surface. A solution is required, and it is to that end that the present invention has been developed.

BRIEF SUMMARY OF THE INVENTION

The present invention is an ECC with improved workability while retaining the high tensile strength and ductility of less workable compositions in the prior art.

The inventive composition is a high quality, high performance, ready-to-use, one-component cementitious repair mortar that can be applied by low pressure spray or trowel. It is a concrete repair product adapted for use in repair work, maintenance, or new construction. It is easy to use, safe, and approved for use around potable (drinking) water. And because it is safe for use where potable water is pumped and stored, the inventive composition can also be used to repair concrete pipes, holding tanks, and reservoirs where drinking water is stored or conveyed.

In addition to its suitability for use on potable water pipes, tanks, and reservoirs, the polyvinyl alcohol engineered ductile mortar ("PVA-EDM") of the present invention can be used on any type of concrete and mortar, whether at grade level, above grade, or below grade. The inventive PVA-EDM is designed for a broad spectrum of uses, including use on walkways, ramps, bridges, parking structures, tunnels, dams, industrial plants, vertical and overhead surfaces; anywhere a high strength concrete repair mortar is needed. It was created especially for use on vertical and overhead surfaces and facilitates the easy repair of such difficult-to-fix surfaces.

The inventive PVA-EDM is a high strength, fiber reinforced mortar, shrinkage-compensated to ensure minimal shrinkage during setting. ASTM C157' shrinkage test reports for a preferred embodiment show it to have −0.045% shrinkage after 28 days of drying. These results are vastly superior to any known ECCs. It also provides high early strength and superior bond strength, which results in superior adhesion, while still having improved rheological characteristics.

When set, it has very low permeability (having an average coefficient of permeability of $3.44^{-11}$ m/s sealed, and an average $4.06^{-11}$ m/s unsealed). The permeability of good quality concrete (well cured, properly consolidated) generally ranges between $10^{-12}$ m/s, but in practice and more commonly ranges from $10^{-10}$ to $10^{-13}$ m/s. The PVA-EDM of the present invention can be sprayed and used as a stucco-type finish. Accordingly, it offers superior protection as an exterior finish, inasmuch as the permeability of known stucco compositions ranges from $10^{-8}$ to $10^{-10}$ m/s.

The inventive PVA-EDM also has low rapid chloride penetration, high fiber dispersion without flocculation, bulking, or aggregation, and it is strongly resistance to de-icing salts, freezing, thawing, and abrasion, vastly exceeding the resistance offered by conventional Portland cement mortar.

Most importantly, and as a principal object and advantage of the present invention, the inventive PVA-EDM offers excellent workability. Specifically, it can be troweled and screeded and troweled immediately after batching and placing the mortar mixture, which is essentially unheard of for engineered cementitious composites having the desired tensile strength and ductility and used for the above-described purposes. Further, it reaches a strength sufficient to meet all standards and regulations within four (4) hours, but it reaches full strength 28 days later.

The PVA-EDM does not produce a vapor barrier after application, and it has a coefficient of thermal expansion compatible with that of concrete. Silica fume or another pozzolan may be added to further enhance the product, particularly when a wet spray application is contemplated, though it enhances workability for both trowel and spray applications.

The PVA-EDM of the present invention is extremely simple to use. Only the addition of water is required to make the composition suitable for application. A zero slump to semi-flowable mixture is adjusted onsite by controlling the added water. The PVA-EDM initially sets in 35 to 55 minutes and finally sets in 1.5-2 hours (at 73° F. [22.8° C.]).

The inventive composition is designed never to crack, whether applied to concrete, asphalt, metal, wood, or soil. It is the only product known that can be applied over existing cracks that will eliminate crack propagation and prevent the treated areas from re-cracking, and it provides high flexural and tensile performance in applications as thin as one-quarter inch. When applied as an overlay in a suitable range of approximately ¼ to 2 inches in thickness, it shows very high ductility, allowing the product overlay to "flex" without failure. The high fiber bond provided by the fully set product reduces chipping, cracking, impact damage, delamination, and typical edge damage. Cracks normally caused by ground movement are minimized through the "bending" and micro-cracking of the product. The chemistry of the inventive PVA-EDM is calculated to provide an expected service life of 100 years without the use of potentially harmful chemicals, acrylics or epoxies.

DETAILED DESCRIPTION OF THE INVENTION

For reasons that are evident when the product is employed, the ductile, high tensile strength, workable PVA-EDM of the present invention has been dubbed "Elephant Armor," and in its preferred embodiments includes the ingredients set out in the following tables.

Table 1 shows the ingredients and their relative percentages, by volume, for providing an ultra-high performance mortar for concrete repair and overlay:

TABLE 1

| (a) Cement (Rapid Set) | 27.5-40.0% |
| --- | --- |
| (b) Cement (Type 1 or Type 2) | 6.25-7.5% |
| (c) Fly ash (Type F or C) | 19.0-31.55% |
| (d) 60 mesh sand | 32.1-32.7% |
| (e) Matrix interactive fibers | 1.45-1.6% |

TABLE 1-continued

| Admixtures: | |
| --- | --- |
| (A) Viscosity enhancing agent | 0.125-0.275% |
| (B) Defoamer/plasticizer | 0.17-0.31% |
| (C) Water reducer | 0.075-0.22% |

The matrix interactive fibers are preferably medium denier fibers, and still more preferably medium denier monofilament PVA fibers, such as the Kuraray PVA RECS15 fibers for cement, mortar, and concrete, manufactured and sold by Kuraray America, Inc., of Houston, Tex. Alternative PVA fiber could be employed were it to have a diameter of substantially 0.04 mm, a 15 dtex thickness, an 8 mm cut length, a 1.6 GPa tensile strength, a 7% elongation, a Young's modulus of 40 kN/mm$^2$, and a specific gravity of 1.3. Fiber types such as the Kuraray RSC7, RSC15, RFS400, and RF4000, could also be employed, though with slightly less advantageous results.

Admixture (A) is a powdered viscosity enhancing agent for stabilizing fluid cement, to prevent bleeding and segregation of composition components, and to disperse the PVA fibers to provide a uniform mixture. An exemplary product providing the desired chemical characteristics may be found in STARVIS® 3003 F, made by BASF Construction Polymers GmbH, of Trostberg, Germany. [STARVIS is a registered trademark of BASF.]

Admixture (B) comprises a silicone free powdered defoamer which reduces composition foaming and has a small plasticizing effect, thereby increasing the ease with which the composition can be spread on a surface. It is a blend of liquid hydrocarbons and polyglycols on an inorganic carrier with an ash content of approximately 35% and an apparent density of 600 g/l. An exemplary product providing the desired chemical characteristics may be found in AGITAN® P 823, made by Munzing—Ultra Additives LLC of Bloomfield, N.J. [AGITAN is a registered trademark of Munzing Chemie GmbH, of Heilbronn, Germany.]

Admixture (C) is a high-range water reducing admixture with a plasticizing effect. An exemplary water reducer providing the desired chemical characteristics may be found in Eucon 37 P, made by Euclid Chemical Company of Cleveland, Ohio.

Thus, contrary to the widely accepted teaching in the field, the use of polycarboxylate ether superplasticizers is not necessary to achieve an improved cementitious composite material having high ductility, workability (including sprayability, where needed), and matrix fiber distribution with superior compressive and tensile strength, impermeability, and shrinkage characteristics. The inventive composition achieves this unusual combination of attributes.

From the foregoing it will be seen that in its most essential aspect, the inventive composition is a high performance engineered composite cementitious ductile mortar comprising: (1) a predetermined amount of composite fibers; a water reducer which reduces the amount of water needed for mixing the composition, said water reducer having a plasticizing effect; and a defoamer having a plasticizing effect to reduce composition foaming, to ensure generally uniform distribution of said matrix interactive fibers within the composition when mixed with water, to reduce particle flocculation, aggregation and bulking, and to improve the flow characteristics of the composition during application. The composition achieves the desired rheological characteristics as well as the necessary tensile and ductile strength for industrial and commercial applications without the need of any carboxylic acid polymer or carboxylic acid copolymer based superplasticers.

The inventive composition demonstrates high performance characteristics under ASTM C109, which describes the standardized methodology for testing the compression strength of mortars using cubes of material that are two inches on a side, ASTM C947, which describes the methodology for determining the flexural ultimate strength in bending and the yield strength of glass-fiber reinforced concrete sections, and ASTM C 494, which describes the methodology for determining the splitting tensile strength of concrete cylinders. Three different products using the inventive composition were designed and tailored for the specific uses to which they would be put, and such factors such as opening time to traffic for a concrete or asphalt patch were considered in the design. Using tests conducted at 28 days after application, products using the inventive composition showed the following characteristics: (1) Testing at 28 days under ASTM C 109, a mortar product demonstrated 3500 to 5500 psi compressive strength; an asphalt patch product demonstrated 5000 to 7000 psi; and a DOT (Department of Transportation) product demonstrated 7000 to 9000 psi compressive strength. (2) Testing at 28 days under ASTM C947, the mortar product demonstrated 800 to 1100 psi flexural strength; the asphalt patch product demonstrated 1100 to 1400 psi; and the DOT product demonstrated 1200 to 1600 psi flexural strength. (3) Testing at 28 days for splitting tensile strength under ASTM C 494 modified for fibre reinforced concrete, showed the mortar within a range of 500 to 700 psi, the asphalt patch product within a range of 700 to 900 psi, and the DOT product within a range of 1000 to 1300 psi splitting tensile strength.

The above disclosure is sufficient to enable one of ordinary skill in industrial chemistry and related arts to practice the invention, and provides the best mode of practicing the invention presently contemplated by the inventor. While there is provided herein a full and complete disclosure of the preferred embodiments of this invention, it is not desired to limit the invention to the exact composition or compositions described. Various modifications, alternative relative amounts of composition ingredients and their equivalents will readily occur to those skilled in the art and may be employed, as suitable, without departing from the true spirit and scope of the invention.

Therefore, the above description and illustrations should not be construed as limiting the scope of the invention, which will be defined by claims set out in a non-provisional patent application claiming the benefit of the priority date of the instant provisional patent application.

What is claimed as invention is:

1. A high performance engineered composite cementitious ductile mortar ("ECC") composition comprising:
   27.5-40.0% rapid set cement;
   6.25-7.5% Type 1 or Type 2 cement;
   19.0-31.55% Type F or Type C fly ash;
   32.1-32.7% sand;
   1.45-1.6% matrix interactive fibers;
   0.125-0.275% viscosity enhancing agent;
   0.17-0.31% plasticizer; and
   0.075-0.22% water reducer,
   wherein each of said plasticizer and said water reducer do not comprise a carboxylic acid polymer or carboxylic acid copolymer.

2. The ductile mortar ECC composition of claim 1, wherein said matrix interactive fibers are medium denier fibers.

3. The ductile mortar ECC composition of claim 2, wherein said medium denier fibers are medium denier monofilament PVA fibers.

4. The ductile mortar ECC composition of claim 1, wherein said plasticizer is a silicone free powdered plasticizer.

5. The ductile mortar ECC composition of claim 4, wherein said plasticizer is a blend of liquid hydrocarbons and polyglycols on an inorganic carrier.

6. The ductile mortar ECC composition of claim 1, wherein said matrix interactive fibers have a diameter of approximately 0.04 mm, a 15 dtex thickness, an 8 mm cut length, a 1.6 GPa tensile strength, a 7% elongation, a Young's modulus of 40 kN/mm$^2$, and a specific gravity of 1.3.

7. The ductile mortar ECC composition of claim 1, wherein said viscosity enhancing agent is a powdered viscosity enhancer for stabilizing fluid cement for preventing bleeding and segregation of said ECC composition components and for dispersing said matrix interactive fibers so as to provide a uniform mixture.

8. The ductile mortar ECC composition of claim 1, wherein said ductile mortar sets in 35 to 55 minutes and finally sets in 1.5-2 hours at 73° F.

9. An engineered ductile mortar composition, comprising:
   rapid set cement;
   Type 1 or Type 2 cement;
   Type F or Type C fly ash;
   sand;
   matrix interactive fibers;
   a viscosity enhancing agent;
   a plasticizer; and
   a water reducer.

10. The engineered ductile mortar of claim 9, wherein said matrix interactive fibers are medium denier monofilament polyvinyl alcohol based fibers.

11. The engineered ductile mortar of claim 9, wherein when set, said engineered ductile mortar has an average coefficient of permeability less than $10^{-10}$ m/s.

12. The engineered ductile mortar of claim 9, wherein said engineered ductile mortar, when set, has low rapid chloride penetration.

13. The engineered ductile mortar of claim 9, wherein said engineered ductile mortar does not produce a vapor barrier after application, and it has a coefficient of thermal expansion compatible with that of concrete.

14. The engineered ductile mortar of claim 9, further including a pozzolan to enhance pumpability for a wet spray application or workability for both trowel and spray applications.

15. The engineered ductile mortar of claim 9, wherein said engineered ductile mortar does not include a polycarboxylate ether superplasticizer.

16. The engineered ductile mortar of claim 9, wherein said engineered ductile mortar is safe for use around potable water and can be used to repair concrete pipes, holding tanks, and reservoirs where drinking water is stored or conveyed.

* * * * *